United States Patent
Satou et al.

[11] Patent Number: 6,058,562
[45] Date of Patent: May 9, 2000

[54] GROMMET

[75] Inventors: Minoru Satou; Ryouji Mori, both of Yokkaichi, Japan

[73] Assignee: Sumitomo Wiring Systems, Ltd., Yokkaichi, Japan

[21] Appl. No.: 09/102,579

[22] Filed: Jun. 23, 1998

[30] Foreign Application Priority Data

Jul. 4, 1997 [JP] Japan ................................. 9-179747

[51] Int. Cl.$^7$ ................ F16L 5/00; H02G 3/22
[52] U.S. Cl. .......................... 16/2.1; 174/153 G
[58] Field of Search ................. 16/2.1, 2.2, 2.5; 277/606, 630, 919; 411/508, 509, 913, 907; 174/65 G, 152 G, 152 R, 153 G, 167

[56] References Cited

U.S. PATENT DOCUMENTS

| | | | |
|---|---|---|---|
| 737,407 | 8/1903 | Hirsch | 16/2.1 |
| 2,225,472 | 12/1940 | Franklin | 277/606 |
| 3,243,206 | 3/1966 | Samer | 16/2.1 |
| 3,829,184 | 8/1974 | Chevret | 16/2.1 |
| 4,192,477 | 3/1980 | Decky et al. | 16/2.1 |
| 4,488,206 | 12/1984 | Mizusawa | 411/508 |
| 4,535,196 | 8/1985 | Milne | 174/83 |
| 4,685,173 | 8/1987 | Pavur | 174/153 G |
| 4,971,500 | 11/1990 | Benoit et al. | 411/508 |
| 5,448,017 | 9/1995 | Nakajima et al. . | |
| 5,526,549 | 6/1996 | Mori et al. . | |

FOREIGN PATENT DOCUMENTS

| | | |
|---|---|---|
| 7-115286 | 5/1995 | Japan . |
| 10-12072 | 1/1998 | Japan . |

OTHER PUBLICATIONS

Copy of an English Language Abstract of JP No. 7–115286.

*Primary Examiner*—Chuck Y. Mah
*Attorney, Agent, or Firm*—Greenblum & Bernstein, P.L.C.

[57] ABSTRACT

The present invention relates to a grommet capable of easy installation by reducing an insertion resistance when conducting an insertion of the grommet into an opening of a vehicle panel. The configuration of the grommet allows molds for forming the grommet to have reduced processing costs, and molding and installation time can also be decreased. The grommet includes wire harness holding areas for tightly engaging around the periphery of the wire harness and an engagement area which fixedly engages an opening provided on a vehicle panel. A tapered area connects a wire harness holding area and an engagement area with a near-conical tapered surface extending over the outer surface of a tapered area, and a plurality of linear convex areas are provided to extend from a wire harness holding area to the engagement area, in an insertion direction of the grommet over the entire periphery on the tapered area.

16 Claims, 8 Drawing Sheets

GROMMET

BACKGROUND OF THE INVENTION

1. Field of the Invention

The present invention relates to a grommet which holds a wire harness having a route that penetrates an opening in a panel, particularly an opening in a vehicle panel, etc.

2. Description of Background Information

Wire harness arrangement routes for vehicles have recently become more complicated and versatile as mounting of various electrical components on vehicles advances. This requires a wide use of parts for wire harness protection or maintenance, such as harness protectors for avoiding interference with peripheral parts and grommets used for penetrating through the openings provided in a vehicle panel.

In particular, via an opening which is formed in a vehicle panel, a grommet formed of integrally molded rubber, etc. is generally used on a wire harness having a route, for instance, from an engine compartment to a passenger compartment or from a vehicle body to door areas, for the purpose of holding a cable arrangement route and avoiding contact with the vehicle panel and resulting damages. For example, as shown in FIG. 7, a conventional grommet 10f to be mounted on a wire harness 16, which is arranged to penetrate a vehicle panel 20, includes wire harness holding areas 11 and 12 for engaging around and tightly holding the outer periphery of the harness. An engagement area 13 is provided for fixedly engaging the grommet 10f to a predetermined opening formed in the vehicle panel, and a tapered area 14 connects the wire harness holding area 11 and the engagement area 13 over a near-conical tapered area. In this case, the grommet 10f is connected to the wire harness 16 by means of fixing tapes 17 and 18 at the respective wire harness holding areas 11 and 12.

The description which follows makes reference to FIGS. 8(a) and 8(b) regarding an insertion operation and an engaged condition relative to a panel opening in accordance with the conventional grommet 10f.

As shown in FIG. 8(a), when the grommet 10f, which is fixedly connected to a wire harness 16, is drawn in an insertion direction, via an opening from one side (a left side as shown in the drawing) of a vehicle panel 20, by taking a wire harness holding area side (left direction in the drawing) provided on the tapered area 14 as an inserting direction, an insertion resistance arises as a result of sliding contact at the edge areas between the tapered area 14 and an opening 21. Therefore, by further drawing the grommet 10f with a force greater than the insertion resistance, applied in the direction shown by the arrow designated F3, the engagement area 13 is fixedly engaged in the opening 21 as shown in FIG. 8(b), and a predetermined route is maintained, without harness 16 making contact with the opening 21.

With the conventional grommet 10f, there was a problem of considerable worsening of the mounting workability of the wire harness 16 due to an insertion resistance becoming greater as a result of sliding contact with the surface of the tapered area 14 over the entire area by the edge of the opening 21 during insertion of the grommet and harness into the opening 21.

In addition, another factor increasing the insertion resistance includes the use of material having a higher deformability which lacks surface slidability such as the integrally molded rubber of the grommet 10f, which further increases the frictional resistance with the edge area of the opening 21, thereby necessitating a greater drawing force F3.

One known solution to this problem is shown in the Japanese unexamined Patent Publication No. (Hei) 7-115286. Such a method as reducing a frictional resistance, or insertion resistance, by applying many minute concave/convex areas on the surface of a tapered area, namely, applying a electrical discharge process, thereby making a contact area with an edge area smaller at insertion when inserting the work into the opening.

According to this known solution, a method for forming concave/convex areas on the mold die by electrical discharge machining is generally utilized to form a plurality of concave/convex areas on the tapered surface of the grommet formed from integrally molded rubber, thus forming concave/convex areas on the tapered area formed on the integrally molded rubber grommet. However, the electrical discharge machine has an extremely slow processing speed compared with the case of using normal NC processing (mechanical processing by use of cutting tools), and a problem of higher processing cost.

An objective of the present invention is to provide a grommet that allows easy engagement by reducing an insertion resistance during insertion of the grommet into the opening of vehicle panel, thereby providing a grommet capable of reducing the machining cost for molding dies as well as the machining time.

SUMMARY OF THE INVENTION

In order to achieve the above-mentioned objective according to one aspect of the present invention, a grommet is provided that includes a linear holder portion adapted to tightly engage around the periphery of a member inserted therein, an engagement area for engagement with an installation opening into which the linear holder portion is arranged to penetrate, and a tapered portion which connects the linear holder portion and the engagement area. A plurality of linear convex areas are provided to extend around the periphery of outer surface of the tapered portion to extend from the linear holder portion to the engagement area, and are configured to slidably contact an edge of the installation opening, thus reducing insertion resistance of the grommet during installation.

In another aspect of the present invention, the grommet of the present invention includes a linear holder portion adapted to tightly engage around the periphery of a member inserted therethrough, an engagement area for engagement with an installation opening through which the linear portion is arranged to penetrate. The grommet is further formed with a tapered portion that connects the linear holder portion and the engagement area. A plurality of linear concave areas are provided on the tapered portion and are arranged to extend from adjacent the engagement area side toward the linear holder portion side around the entire periphery of the tapered portion. Thus, convex tapered areas are formed between adjacent linear concave areas, and the convex tapered areas are configured to slidably contact the edge of the installation opening in the panel, thus reducing insertion resistance of the grommet during installation. Additionally, the linear concave areas allow the tapered area to fold inwardly in the manner of an umbrella or a bellows to thereby further reduce insertion resistance of the grommet during installation.

According to the grommet of the present invention, by providing a linear convex area or linear concave area in an insertion direction over the full periphery of the tapered area, only an upper surface of the linear convex areas or convex tapered areas formed between adjacent linear concave areas make sliding contact with the edge of the installation opening during insertion into or engagement with the predetermined opening area of the grommet. Therefore, the grommet structure of the present invention allows the insertion resistance to be reduced by reducing the contact area between the installation opening area and the grommet during insertion, also improving a mounting workability of a wire harness by reducing the drawing force required during insertion of the grommet.

Other aspects of the present invention include forming the linear convex areas of the grommet from a material that is harder than that forming the tapered portion, thereby further reducing the insertion resistance of the grommet, forming the linear convex areas to terminate adjacent the holder portion, forming the linear convex areas and linear concave areas to terminate adjacent the holder portion, and forming the linear convex areas to project a distance above the tapered portion so that the distance of projection tapers from a greater distance at an end thereof adjacent the engagement area to a lesser distance at the opposite end thereof.

According to a further aspect of the present invention, the linear convex areas and the linear concave areas can be configured to extend no more than half the distance between the engagement area and the holder portion. Moreover, the grommet of the present invention can include a second linear holder portion adapted to tightly engage around the periphery of the wire harness inserted therethrough, the second holder portion being formed on the grommet adjacent the engagement area.

Furthermore, the grommet of the present invention is not limited to any particular shape, but can be configured with an engagement area having various shapes, including circular, non-circular, generally elliptical or generally rectangular. The grommet can also be configured such that the linear concave areas and linear convex areas are arranged to be equally spaced about the tapered portion.

Furthermore, since a linear convex area or a linear concave area is formed on the tapered area by utilizing a cutting process on the tapered area of the molding die using machining processing or a processing on the ridge area in advance. Accordingly, a grommet is extremely easily formed which has a predetermined linear convex area or linear concave area within a short period of time. Thus, it is possible to control the molding die processing to be less complicated while making the processing time shorter.

BRIEF DESCRIPTION OF THE DRAWINGS

The above and other features and advantages of the present invention will be made apparent from the following description of the preferred embodiments, given as non-limiting examples, with reference to the accompanying drawings, in which like reference numerals represent similar parts throughout the several views of the drawings.

DETAILED DESCRIPTION OF THE PREFERRED EMBODIMENTS

Figure 1:
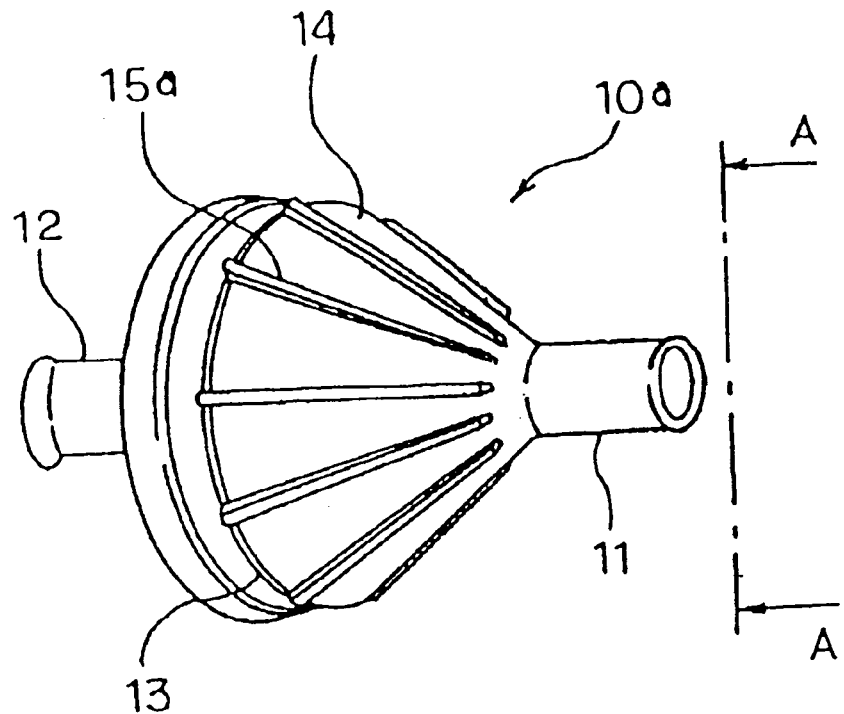
FIGS. 1(a) and 1(b) show a first embodiment of the grommet of the present invention.
Figure 1:
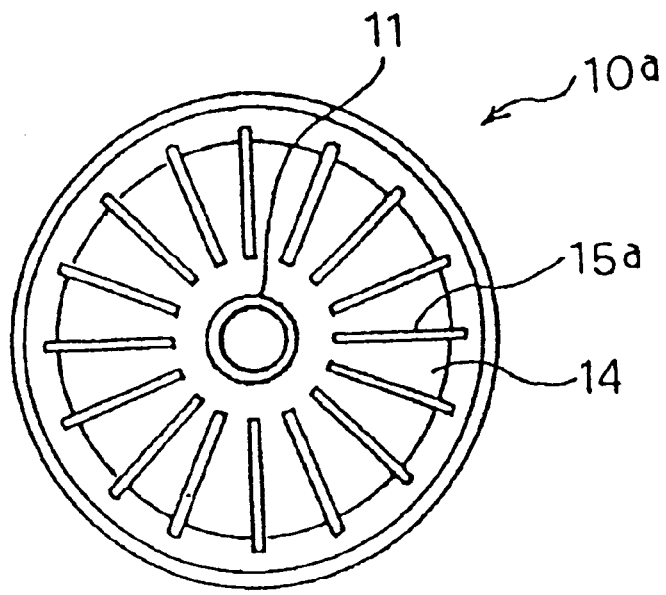

A first embodiment of the grommet of the present invention will now be described with regard to the present invention in reference to FIGS. 1(a) and 1(b). As shown in FIG. 1(a) and FIG. 1(b), a grommet 10a includes wire harness holding areas 11 and 12 which tightly engage and hold the outer periphery of a wire harness. An engagement area 13 is provided to fixedly engage with an installation opening provided in a vehicle panel. A tapered area 14 having a near-conical tapered shape over a full periphery thereof extends between the wire harness holding area 11 and the engagement area 13, and plurality of spaced linear convex areas 15a are provided to extend from an engagement area 13 side toward a wire harness holding area side over the entire periphery of the tapered area 14, that is, in an inserted direction of the grommet.

The linear convex surfaces 15a are integrally formed with the grommet from the same material as that of the grommet, which is achieved by utilizing a machining process to form a plurality of grooves, which correspond to the linear convex surfaces 15a, by applying the machining processing to the molding die in the area corresponding to the tapered area 14. Therefore, the processing work can be readily accomplished within a short period of time at a lower cost.

In the embodiment depicted in FIG. 1(a) and FIG. 1(b), a grommet structure is shown in which each linear convex surface 15a is uniformly arranged on the tapered area 14. That is, each linear convex surface has a uniform length, protruding height, convex section area, and a uniform radiating shape with uniform angle from wire harness holding area 11 is shown. Nevertheless, the present invention is not limited to this structure alone.

Figure 2:
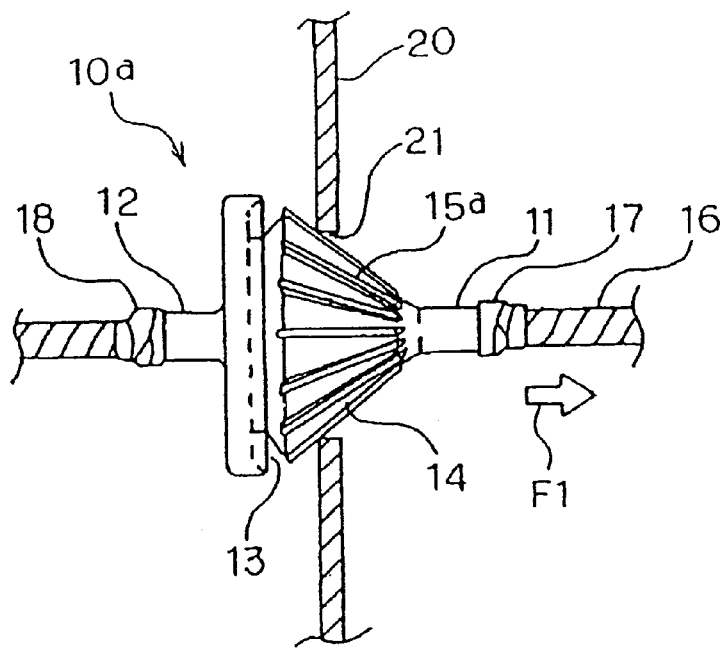
FIGS. 2(a) and 2(b) depict an insertion operation and an engaged condition of the grommet of the present invention, respectively.
Figure 2:
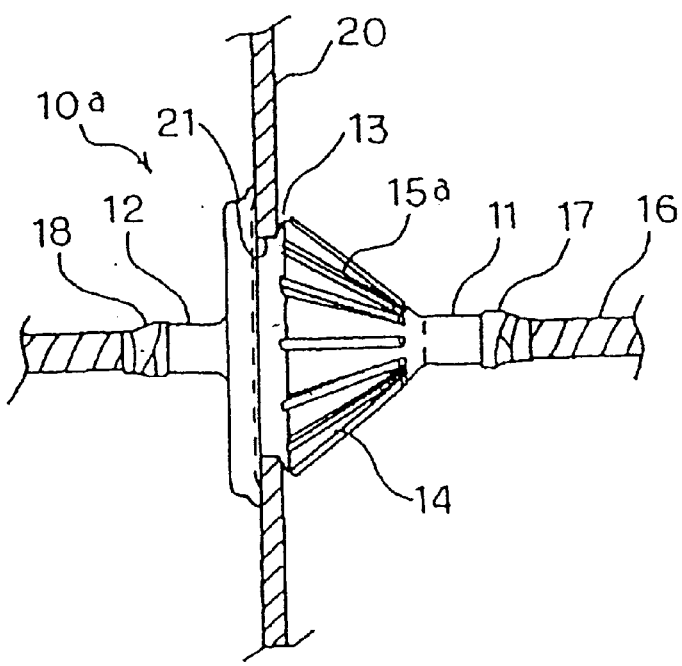

The following description is of an insertion and engaged condition of grommet 10a with an installation opening according to the first embodiment of the invention with reference to FIGS. 2(a) and 2(b).

As shown in FIG. 2(b), a grommet 10a, which is fixedly attached with fixing tapes 17 and 18 to the outer peripheral surface of the wire harness 16 by the wire harness holding areas 11 and 12, is inserted by applying a force to a wire harness holding area 11 (right direction in the drawing) in which a tapered area 14 is provided as an inserted direction. Only an upper surface of each linear convex area 15a, which projects and extends above the remaining surface of the tapered area 14, slidably makes contact with the edge of the opening 21.

Figure 8:
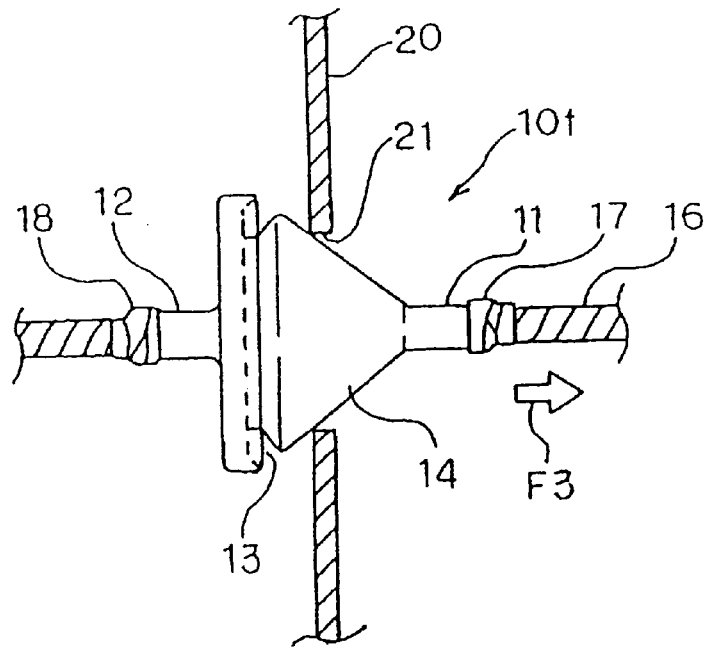
FIGS. 8(a) and 8(b) show an insertion operation and an engaged condition of the grommet of the prior art, respectively.
Figure 8:
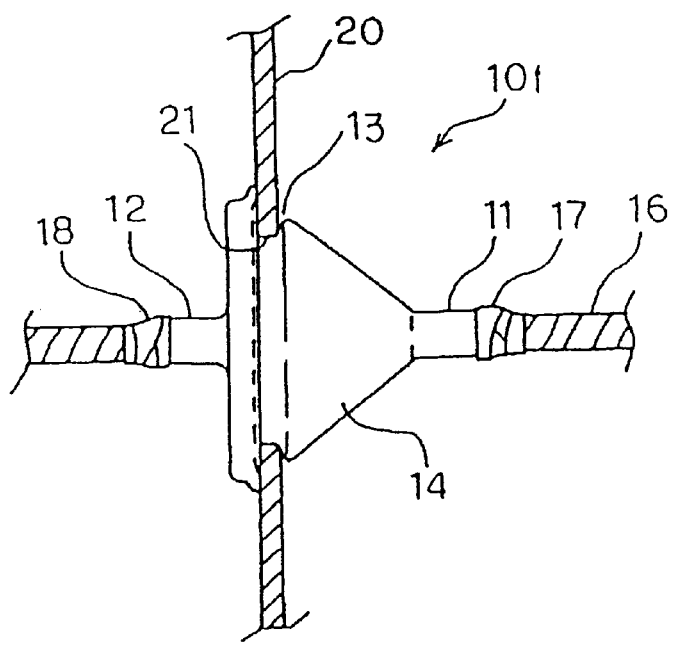

In this case, since the contact area between the edge of the linear convex area 15a and opening area 21 is only determined by the width of upper surface of the linear convex areas 15a, an insertion resistance is reduced when compared with a conventional grommet structure (FIGS. 8(a) and 8(b)) which makes contact with the edge of the opening 21 about the full periphery of the tapered area 14. Therefore, by applying an insertion force (arrow designated F1) smaller than the arrow designated F3 as shown in the conventional structure (FIG. 8(a)), an engagement area 13 of grommet 10a is fixedly engaged in the opening area 21 as shown in FIG. 2(b), and a predetermined arranged route is maintained without the wire harness 16 making contact with the opening 21.

Particularly, since a linear convex area 15a representing the feature of the first embodiment is integrally formed on tapered area 14 from rubber or other elastomeric material, which is the same material as that of the grommet, can inhibit deformation as compared with that of other tapered area 14 due to the thickness of the region in which the linear convex areas are formed, areas 15a become thicker, and the upper surface thereof alone can slidably contact the edge of the opening 21 with good lubrication and deformation is inhibited even in the event the linear convex areas 15a have a narrow width.

Moreover, while the linear convex areas 15a have been disclosed to include a structure formed integrally of rubber or other elastomeric material, which material is the same as that of grommet 10a, the present invention is not so limited. For example, by forming the linear areas 15a separately by using a two-color forming method, or the like, with a material harder than that of main portion of grommet 10a, the insertion resistance can by further decreased with the width of linear convex area 15a being made narrower.

Figure 3:
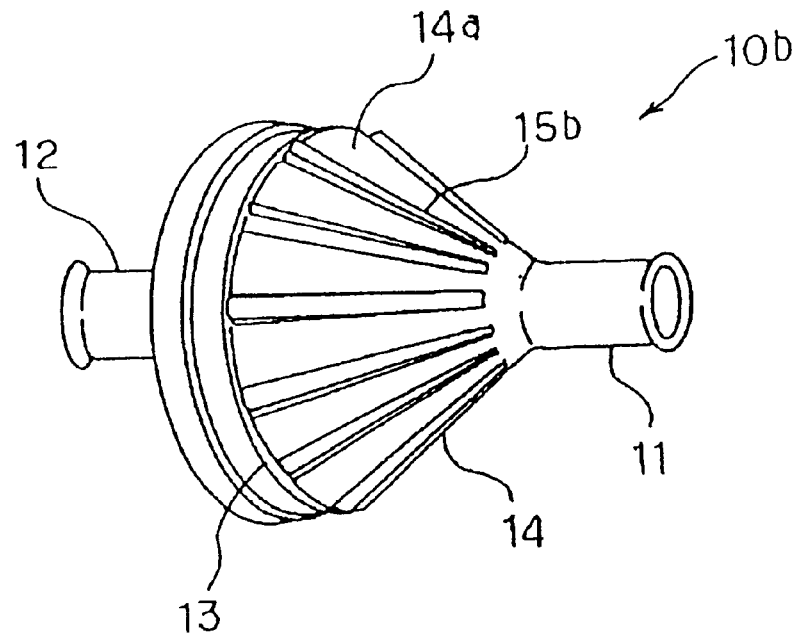
FIGS. 3(a) and 3(b) show a second embodiment of the grommet of the present invention.
Figure 3:
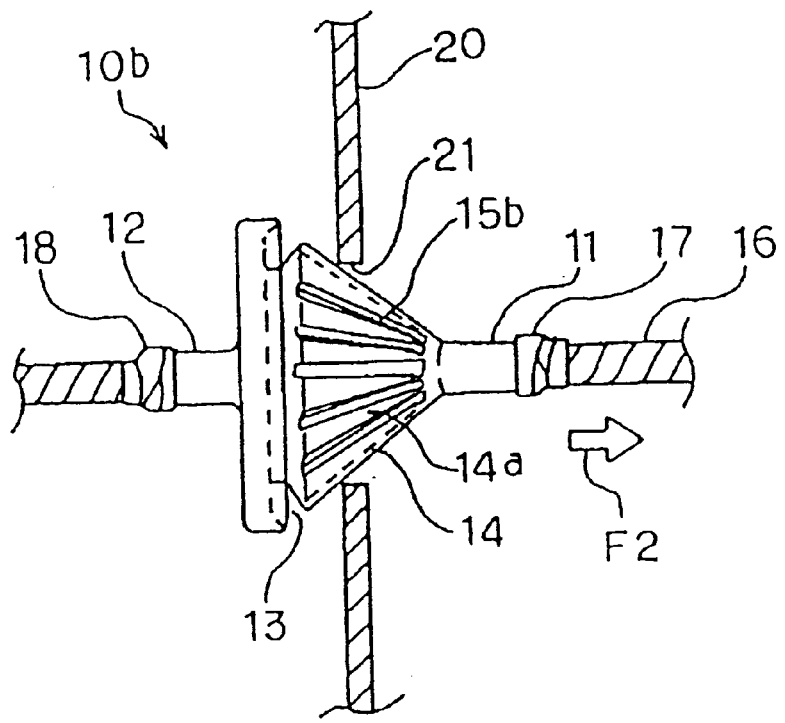

The second embodiment of the grommet relating to the present invention is described as follows with reference to FIGS. 3(a) and 3(b). In this case, for the structure corresponding to the first embodiment, the same reference numerals are used to describe like parts, and additional description has been omitted. As shown in FIG. 3(a), the grommet 10b has a plurality of linear concave areas 15b provided to extend in an insertion direction of the grommet 10b over the entire periphery of the outer surface of the tapered area 14.

Such a grommet 10b can easily be produced at a lower cost with a short processing time, by forming a plurality of ridge areas corresponding to the linear concave areas 15b in advance by mechanically processing the die surface which corresponds to the tapered area 14. A description follows with reference to FIG. 3(b) of an insertion of the grommet 10b within an opening in accordance with the second embodiment.

As shown in FIG. 3(b), with wire harness holding areas 11 and 12, when a grommet 10b, that is fixedly connected to the wire harness 16 with fixing tapes 17 and 18, is inserted by taking the wire harness holding area 11 side (right direction in the drawing) as an insertion direction, only the convex tapered areas 14a adjacent the linear concave areas 15b provided on the tapered area 14 slidably engage the edge of the opening 21. Furthermore, as the grommet 10b is inserted into the opening 21, the convex tapered areas 14a engage the edge of the opening 21, and the concave areas 15b allow the tapered area 14 to fold inwardly, like an umbrella or a bellows, thereby further reducing the insertion force required for installation.

In this case, as the contact area which is made between the tapered area 14 formed by the linear concave areas 15b and an opening 21 is determined by the convex tapered areas 14a, the insertion resistance is further reduced compared with that of the conventional structure (FIGS. 8(a) and 8(b)). Therefore, by applying an insertion force (arrow designated F2) smaller than the insertion force as shown for the conventional structure (arrow designated F3 in FIG. 8(a)), the engagement area 13 of grommet 10a is fixedly engaged in the opening 21, and thus a predetermined route is maintained by the wire harness 16 which does not make contact with the edge of the opening 21.

Particularly, the linear concave area 15b which is a feature of the present embodiment is provided to extend in an insertion direction over the entire periphery of the tapered area 14 of the grommet 10b for insertion into the opening 21 of the vehicle panel 20. Thus, the narrow width convex tapered areas 14a remaining, by forming the linear concave areas 15b, slidably contact the edge of the opening in 21. Therefore, the contact area can be reduced in comparison with the situation of the prior art where contact is made with a full periphery of the tapered area 14, and the tapered area 14 is permitted to fold inwardly during installation, thereby enabling the insertion resistance to be reduced.

Figure 4:
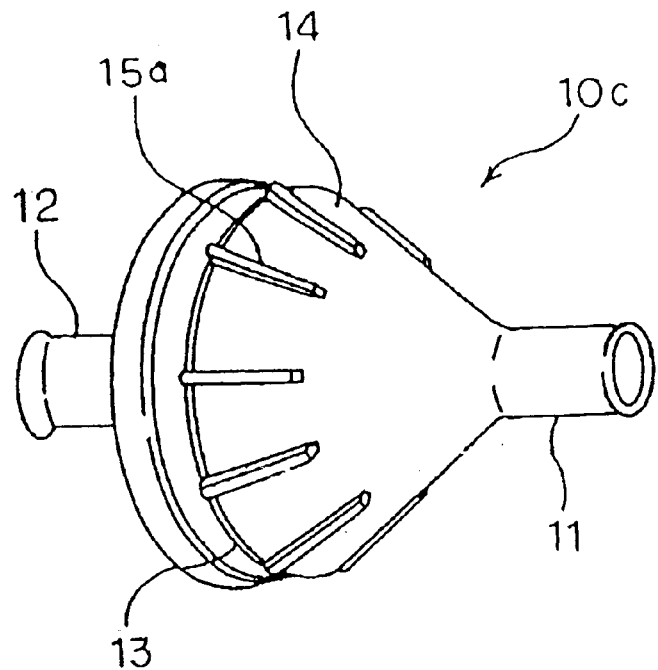
FIGS. 4(a) and 4(b) show a third embodiment of the grommet of the present invention.
Figure 4:
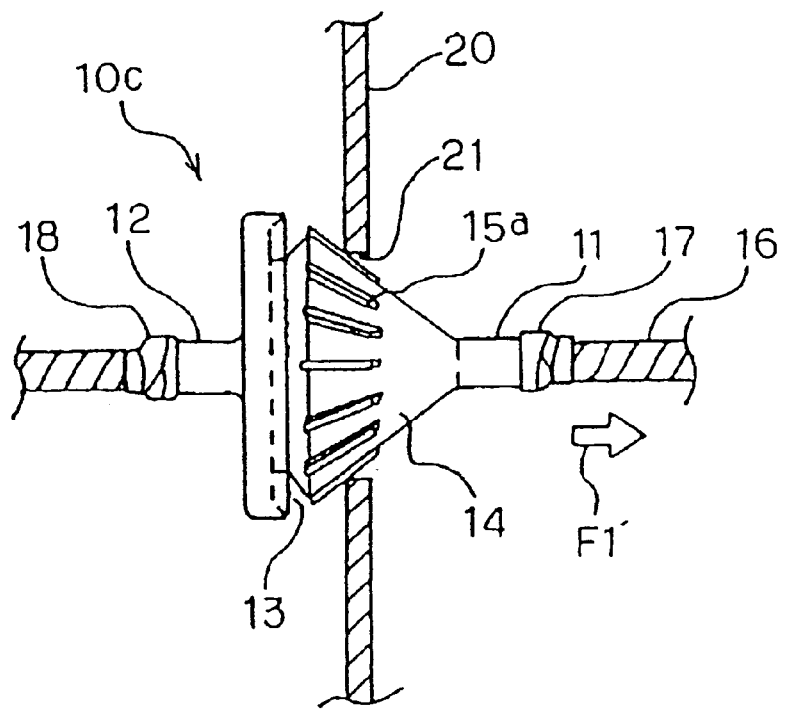

Next, description follows with reference to FIGS. 4(a) and 4(b) of the third embodiment of the grommet relating to the present invention. In this case, for the structure corresponding to that of the first embodiment, the same reference numeral is used to describe like parts, additional description has been omitted.

As shown in FIG. 4(a), a grommet 10c has a plurality of linear convex areas 15a which are provided to extend in an insertion direction of grommet 10c over the entire periphery on the outer surface thereof from adjacent the engagement area 13 side toward, but spaced from, the wire harness holding area 11 side of the tapered area 14.

The insertion engaged condition of grommet 10c with opening 21 is, as shown in FIG. 4(b), effected as follows: the grommet 10c is introduced by taking the wire harness holding area 11 side (right direction in the drawing) as an insertion direction, and only the upper surface of the linear convex areas 15a, which are provided to project from the outer surface of the tapered area 14 near the engagement area 13, can make sliding contact with the edge area of the opening area 21. And, in addition, by applying an insertion force (arrow designated F1' of FIG. 4(b)), the engagement area 13 is fixedly engaged within the opening 21.

That is, since the opening 21 is formed so that the dimension thereof nearly corresponds to the formed dimension of the engagement area 13, normally the wire harness holding area 11 side of the tapered area 14 does not make direct contact with the edge of the opening 21. Therefore, even if the structure does not include a linear convex area 15a on this area, the linear area 15a adjacent to the engagement area 13 side makes contact with the edge of the opening 21. Thus, in a manner similar to the first embodiment, the contact area of the grommet 10c and the opening 21 is determined by the width of the upper surfaces of the linear convex areas 15a, thereby reducing the insertion resistance when compared with the conventional structure (FIGS. 8(a) and 8(b)) which contacts the edge of the opening 21 over the entire periphery of the tapered area 14.

Figure 5:
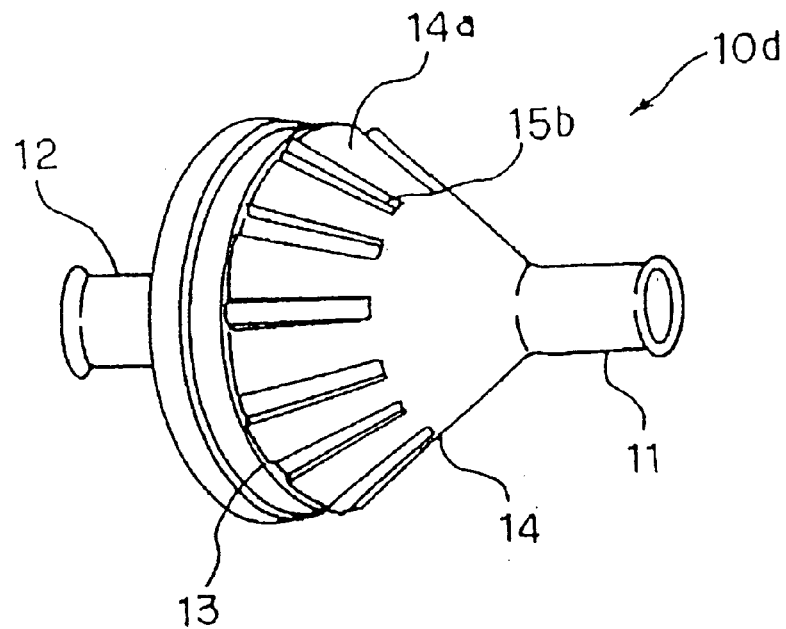
FIGS. 5(a) and 5(b) show a fourth embodiment of the grommet of the present invention.
Figure 5:
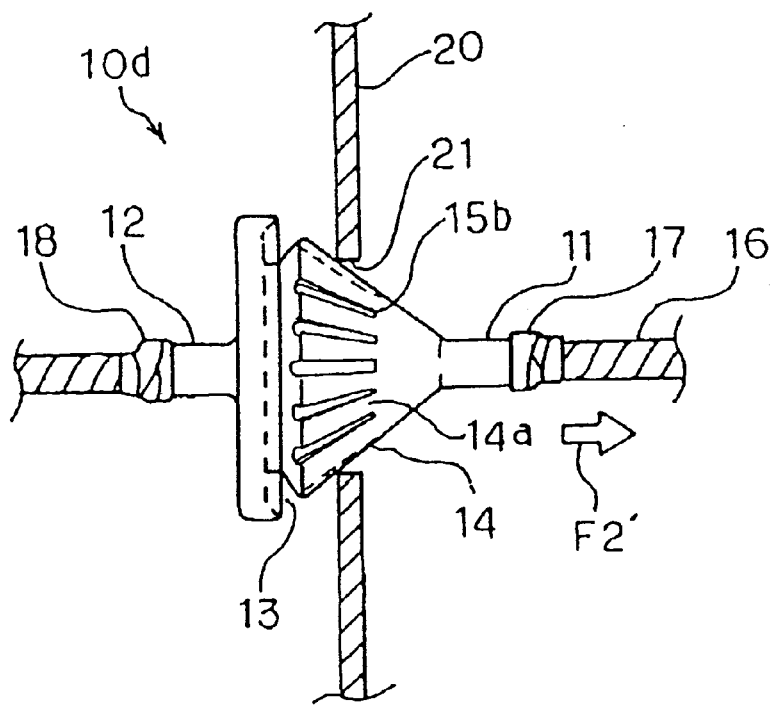

Description follows with reference to FIGS. 5(a) and 5(b) of the fourth embodiment of the grommet relating to the present invention. In this case, for the structure corresponding to that of the second embodiment, the same reference numerals are used to describe like parts, and additional explanation thereof has been omitted.

As shown in FIG. 5(a), the grommet 10d has a plurality of linear concave areas 15b provided to extend in an insertion direction of grommet 10d over the entire periphery of only the outer surface adjacent the engagement area 13 side, and the concave areas 15b are spaced from the wire harness holding area 11 side of the tapered area 14.

The insertion engaged condition of grommet 10d with opening 21 is, as shown in FIG. 5(b), effected as follows: the grommet 10d is introduced by taking the wire harness holding area 11 side (right direction in the drawing) as an insertion direction, and only the convex tapered areas 14a formed by the linear concave areas 15b, which are provided to extend from the outer surface of the tapered area 14 adjacent the engagement area 13, slidably contacts the edge of the opening 21. Additionally, by applying an insertion force (arrow designated F2' of FIG. 5(b)), the engagement area 13 is fixedly engaged with the opening 21.

That is, since the dimension of the opening 21 is roughly formed to correspond with the dimension of the form of the engagement area 13, a wire harness holding area side 11 of the tapered area 14 normally does not directly make contact with the edge of the opening. Therefore, even if the structure does not include linear concave area 15b formed adjacent the wire harness holding area 11 side, a contact area of the tapered area of the grommet 10d and the edge of the opening 21 is determined by the convex tapered areas 14a which are formed between respective linear concave areas 15b in the same manner as in the second embodiment. Because the convex tapered areas 14a, adjacent the engagement area 13 side, remaining by forming the linear concave areas 15b make contact with the edge of the opening 21, and the tapered area 14 including the concave areas 15b can fold inwardly as in the second embodiment, insertion resistance can be reduced compared with the conventional structure (FIGS. 8(a) and 8(b)) which contacts the edge of the opening 21 over the entire periphery of the tapered area 14.

Figure 6:
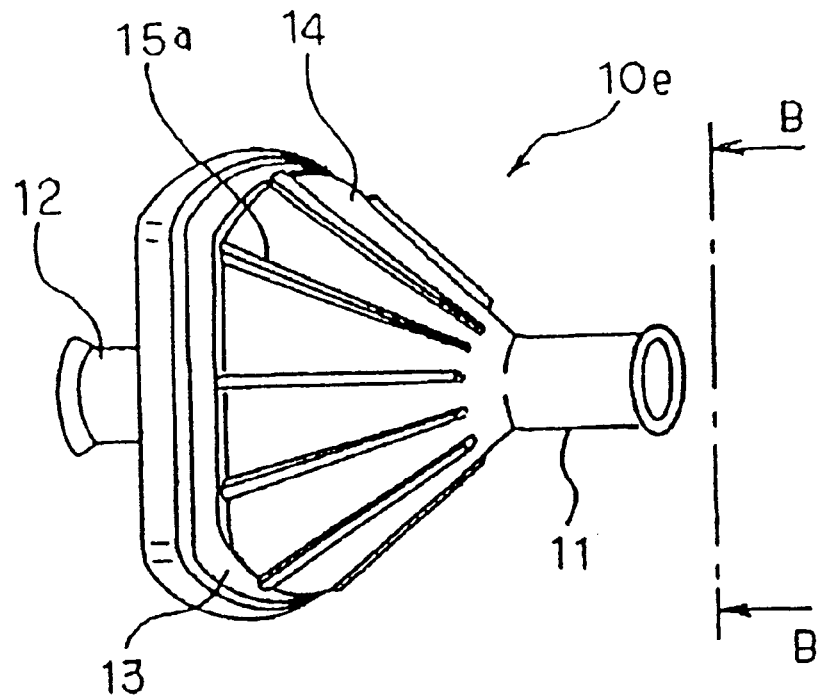
FIGS. 6(a) and 6(b) show another embodiment of the grommet of the present invention.
Figure 6:
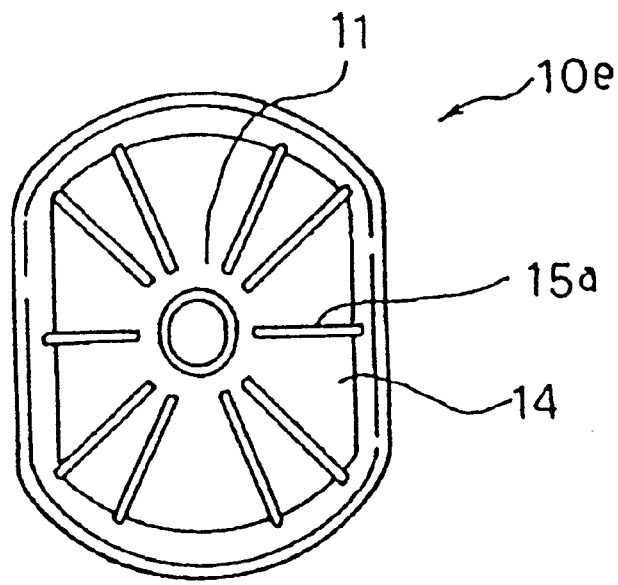
Figure 7:
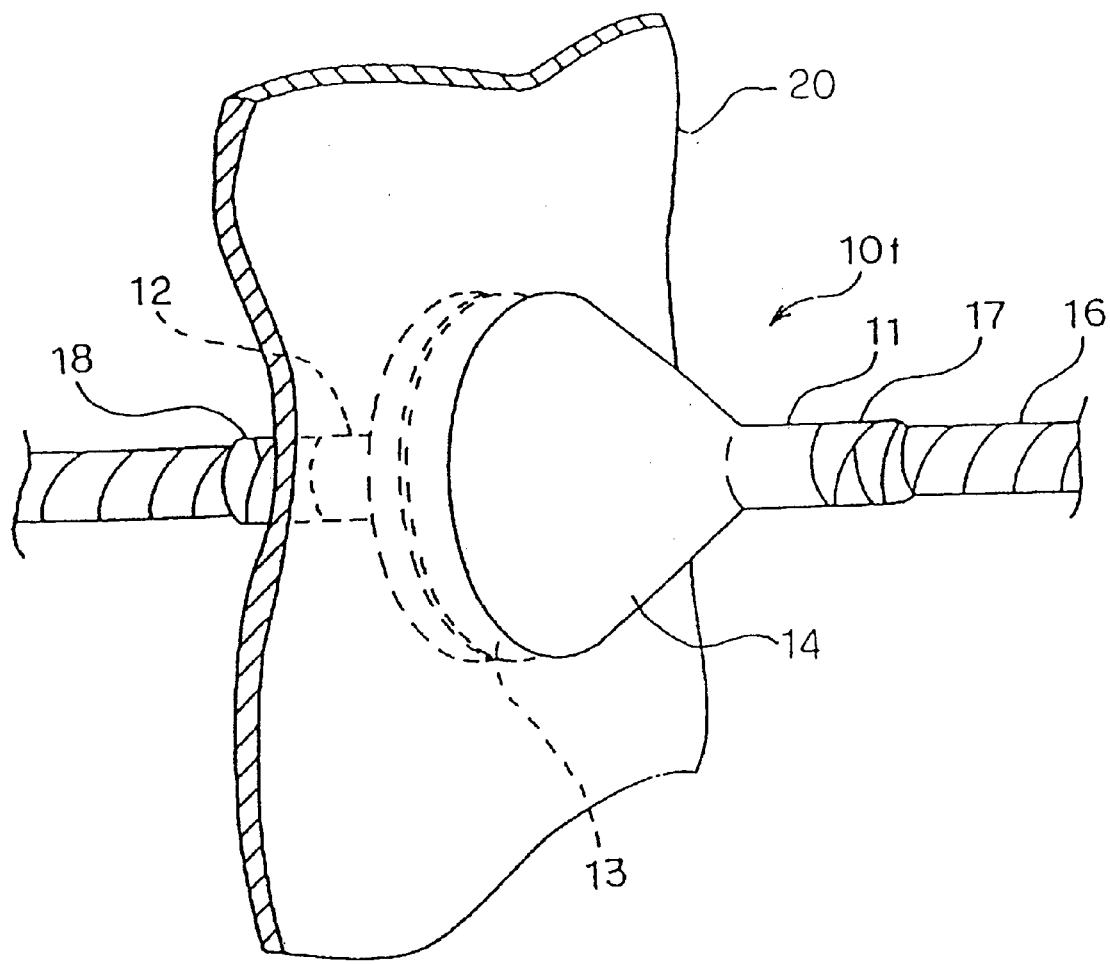
FIG. 7. is a drawing depicting a grommet of the prior art.

In this case, with each of the above-described embodiments, although grommets 10a–10d are shown which have a tapered area 14 connecting the wire harness holding area 11 and the engagement area 13 which is near-conically formed, and the engagement area 13 is formed to have a generally circular shape, the present invention is not necessarily restricted to this configuration. For example, as shown in FIG. 6(a) and FIG. 6(b), the structure may include an engagement area 13 having a near elliptical shape, or a near oval shape, and the grommet 10e is formed with linear convex areas 15a or linear concave areas 15b (not shown). When inserting a grommet 10e within the opening 21, as long as the tapered area 14 has a shape that can make contact with the edge of the opening 21, and linear convex areas 15a or linear concave areas 15b are provided in an insertion direction so that the contact area between the edge and tapered area 14 of the opening area 21 is reduced, the same operational effects as those of other embodiments can be expected.

As mentioned above, according to the grommet of the present invention, by providing linear convex areas or linear concave areas which extend in an insertion direction of the grommet over the full periphery of the tapered surface which forms the tapered area, since only the surface on which the linear convex areas on the upper surface, or the tapered convex surfaces formed between the linear concave areas, slidably contact the edge of the opening when inserting or engaging the grommet of a predetermined opening area, thus the contact area between the grommet and the edge of the opening is reduced. Accordingly, the insertion resistance is subsequently reduced, also reducing the force upon insertion and engaging, thereby improving a workability during mounting of the wire harness.

In addition, because the linear convex area or the linear concave area which are provided to extend on the tapered area can be formed on a grommet having a predetermined linear convex area or a linear concave area by applying a cutting process to the tapered area of molding die using a mechanical processing, or by applying a forming ridge shape area in advance, which consequently enables molding die production cost to be controlled without making the molding die processing method more complicated and increasing the production time.

The advantages and improved results furnished by the method and apparatus of the present invention are apparent from the foregoing description of the preferred embodiment of the invention. Various changes and modifications may be made without departing from the spirit and scope of the invention as described in the appended claims.

The present disclosure relates to subject matter contained in priority Japanese Application No. HEI 9-179747 filed on Jul. 4, 1997, which is herein expressly incorporated by reference in its entirety.

What is claimed:

1. A grommet comprising:

a linear holder portion adapted to tightly engage around the periphery of a member inserted therethrough, an engagement area for engagement with an installation opening through which said linear holder portion is arranged to penetrate;

a tapered portion which connects said linear holder portion and said engagement area;

wherein a plurality of linear convex areas are provided on said tapered portion and are arranged to extend from adjacent said engagement area toward said holder portion around the entire periphery of said tapered portion and are configured to slidably contact an edge of the installation opening during insertion, wherein said linear convex areas are formed from a material that is harder than that forming said tapered portion, thereby reducing insertion resistance of the grommet during installation.

2. A grommet in accordance with claim 1, wherein said linear convex areas terminate adjacent said holder portion.

3. A grommet in accordance with claim 1, wherein said linear convex areas project a distance above said tapered portion, said distance tapers from a greater distance at an end thereof adjacent said engagement area to a lesser distance at the opposite end thereof.

4. A grommet in accordance with claim 1, wherein said linear convex areas extend no more than half the distance between said engagement area and said holder portion.

5. A grommet in accordance with claim 4, wherein said linear convex areas project a distance above said tapered portion, said distance tapers from a greater distance at an end thereof adjacent said engagement area to a lesser distance at the opposite end thereof.

6. A grommet in accordance with claim 1, including a second linear holder portion adapted to tightly engage around the periphery of a member inserted therethrough, said second holder portion formed on said grommet adjacent said engagement area.

7. A grommet in accordance with claim 1, wherein said engagement area is configured to be circular.

8. A grommet in accordance with claim 1, wherein said engagement area is configured to be non-circular.

9. A grommet comprising:

a linear holder portion adapted to tightly engage around the periphery of a member inserted therethrough, an engagement area for engagement with an installation opening through which said linear holder portion is arranged to penetrate; and a tapered portion which connects said linear holder portion and said engagement area;

wherein a plurality of linear concave areas are provided on said tapered portion and are arranged to extend from adjacent said engagement area toward said linear holder portion around the entire periphery of said tapered portion, thereby forming convex tapered portions intermediate said linear concave areas that slidably contact an edge of the installation opening during insertion, thereby reducing frictional insertion resistance of the grommet during installation.

10. A grommet in accordance with claim 9, wherein said linear concave areas terminate adjacent said holder portion.

11. A grommet in accordance with claim 9, wherein said linear concave areas allow said tapered area to fold inwardly in the manner of an umbrella to thereby further reduce insertion resistance of the grommet during installation.

12. A grommet in accordance with claim 9, wherein said linear concave areas extend no more than half the distance between said engagement area and said holder portion.

13. A grommet in accordance with claim 9, wherein said linear concave areas are arranged to be equally spaced about said tapered portion.

14. A grommet in accordance with claim 9, including a second linear holder portion adapted to tightly engage around the periphery of a member inserted therethrough and formed on said grommet adjacent said engagement area.

15. A grommet in accordance with claim 9, wherein said engagement area is configured to be circular.

16. A grommet in accordance with claim 9, wherein said engagement area is configured to be non-circular.

* * * * *